US009146757B1

(12) United States Patent
Subramanian et al.

(10) Patent No.: US 9,146,757 B1
(45) Date of Patent: Sep. 29, 2015

(54) DYNAMICALLY LOADED PLUG-INS TO PROVIDE AN INTEGRATED GRAPHICAL USER INTERFACE

(75) Inventors: Krishnan Subramanian, San Jose, CA (US); Steven J. Perry, San Jose, CA (US); Arun K. Mandhania, San Jose, CA (US)

(73) Assignee: XILINX, INC., San Jose, CA (US)

( * ) Notice: Subject to any disclaimer, the term of this patent is extended or adjusted under 35 U.S.C. 154(b) by 904 days.

(21) Appl. No.: 12/405,189

(22) Filed: Mar. 16, 2009

(51) Int. Cl.
*G06F 3/048* (2013.01)
*G06F 9/445* (2006.01)

(52) U.S. Cl.
CPC .................................. *G06F 9/44526* (2013.01)

(58) Field of Classification Search
USPC ................................................. 715/764, 781
See application file for complete search history.

(56) References Cited

U.S. PATENT DOCUMENTS

| | | | |
|---|---|---|---|
| 6,871,345 B1* | 3/2005 | Crow et al. .................. | 717/175 |
| 2003/0177397 A1* | 9/2003 | Samman ....................... | 713/201 |
| 2006/0085439 A1* | 4/2006 | Sawyer ......................... | 707/100 |
| 2007/0198946 A1* | 8/2007 | Viji et al. ..................... | 715/779 |
| 2007/0226709 A1* | 9/2007 | Coker et al. .................. | 717/140 |
| 2008/0163088 A1* | 7/2008 | Pradhan et al. ............... | 715/764 |
| 2008/0184159 A1* | 7/2008 | Selig ............................. | 715/781 |
| 2009/0106300 A1* | 4/2009 | Brown ........................... | 707/102 |
| 2010/0153929 A1* | 6/2010 | Porras et al. .................. | 717/139 |
| 2011/0022984 A1* | 1/2011 | van der Meulen et al. ... | 715/830 |

OTHER PUBLICATIONS

Merriam-Webster's Collegiate Dictionary, 2003, Encyclopaedia Britannica, Eleventh Edition, p. 704.*
InformAction Open Source Software, No Script, Jan. 1, 2009, http://web.archive.org/web/20090101045009/http://noscript.net/features#contentblocking.*
Naba Kumar, Anjuta Developers Reference Manual, 2004, https://developer.gnome.org/libanjuta/2.32/.*
Greasepot Wiki, Greasemonkey Manual: Monkey Menu, May 13, 2008, http://wiki.greasespotnet/index.php?title=Greasemonkey_Manual:Monkey_Menu&oldid=2577.*
Greasemonkey Hacks, Mar. 18, 2008, O'Reilly Media, https://web.archive.org/web/20080318042645/http://commons.oreilly.com/wiki/index.php/Greasemonkey_Hacks.*

* cited by examiner

*Primary Examiner* — Matt Kim
*Assistant Examiner* — William Trapanese
(74) *Attorney, Agent, or Firm* — Kevin T. Cuenot

(57) ABSTRACT

A method of providing an integrated graphical user interface can include responsive to executing a host computer program, displaying, within a graphical user interface of the host computer program, a visual element of a plug-in that executes in cooperation with the host computer program without loading a functional component of the plug-in within program execution memory of a computer system executing the host computer program. At least a portion of the functional component of the plug-in can be loaded within program execution memory responsive to a selection of the visual element.

15 Claims, 4 Drawing Sheets

200

205 — `<guiLightPlugin name="TePlugin" pluginID="A7A29EC5-AEF7-4590-9ADI-OFC510866B63" library="libGui_GfqTestPlugin1">`

210 —
```
<defineCmd name="te-launch-plugin" menuName="Launch Plugin"
    statusLine="Launch Plugin" toolTipText="Launch Plugin"
    defaultAccel=" " loadIconSet="false" iconBaseName=" ">
</defineCmd>
```

215 —
```
<addMenuBarMenus>
    <popupMenu name="Edit">
        <command name="te-launch-plugin" menuicon="false">
        </command>
    </popupMenu>
</addMenuBarMenus>
```

220 —
```
<addToolBarButtons name="Test Plugin">
    <command name="te-launch-plugin" ></command>
</addToolBarButtons>
```

225 —
```
<fileOpen fileChooserName="Test Plugin">
    <filter name="Text Files (*.txt)"> </filter>
    <matchFileNative matches="*.txt"></matchFileNative>
</fileopen>
```

230 — `<fileNew name="Test Plugin"> </fileNew>`

235 — `<preferencePage libName="libGui_LightPluginPref" classID="cOdd984c-96d8-4clb-aldO-addc25227963"></preferencePage>`

240 — `</guiLightPlugin>`

DYNAMICALLY LOADED PLUG-INS TO PROVIDE AN INTEGRATED GRAPHICAL USER INTERFACE

FIELD OF THE INVENTION

The embodiments disclosed herein relate to the use of plug-ins within a computer program. More particularly, the embodiments relate to dynamically loading plug-ins and/or portions of plug-ins within the computer program to facilitate an integrated graphical user interface.

BACKGROUND

Modern computer programs can provide a complex graphical user interface (GUI) that may be formed from one or more plug-ins. Generally, a plug-in refers to a computer program that interacts with a host computer program to provide a particular function. In some instances, a plug-in executes cooperatively with the host computer program, but need not execute within an execution environment or framework provided by the host computer program. In other cases, the plug-in does execute within an execution environment provided by the host computer program.

For example, a GUI for an electronic design automation (EDA) computer program may utilize one plug-in to provide users with the ability to edit text documents and another plug-in to provide users with the ability to edit schematic diagrams of circuits. Plug-ins also are utilized within Internet browsers and electronic mail clients to expand functionality of the host computer program. Within browsers, for example, plug-ins are used to play particular types of digital content or files.

A plug-in typically is executed as a binary file at startup of the host computer program. Once the plug-in is executing, the plug-in can provide different visual elements that may be integrated into the GUI of the host computer program. These visual elements can include menus items, toolbar buttons, preference controls, or the like. Accordingly, a plug-in must be executed, and therefore loaded into memory of the computer system executing the host computer program (host computer system), for visual elements of the plug-in to be incorporated or displayed within the GUI of the host computer program. Thus, whether or not the functionality provided by the plug-in is utilized within the host computer program, the plug-in still consumes memory of the host computer system. Depending upon the number and complexity of the plug-ins within the host computer program, the amount of memory of the host computer system consumed by the plug-ins may be significant.

In addition, the process of loading and initializing each plug-in within the host computer program requires time. This increases the amount of time needed for the host computer program to finish loading and initialization, thereby increasing the amount of time that a user must wait prior to using the host computer program after launch.

In other cases, the plug-in may not be loaded until such time that the plug-in is needed. For example, when opening a particular type of file within a browser, the plug-in may not be executed until such time that a request to open or otherwise process the type of file handled by the plug-in is issued. Still, because the plug-in is not executing, controls, settings, and other visual elements of the plug-in are not displayed within the GUI of the host computer program and are, therefore, not available to the user until the plug-in is executed. There is no visual integration of the controls or settings, for example, of the plug-in within the GUI of the host computer program until the plug-in is executed.

SUMMARY

The embodiments disclosed within this specification relate to the use of plug-ins within a computer program and to dynamically loading plug-ins within the computer program to facilitate an integrated graphical user interface (GUI). One embodiment of the present invention can include a computer-implemented method of providing an integrated GUI. The method can include, responsive to executing a host computer program, displaying, within a GUI of the host computer program, a visual element of a plug-in that executes in cooperation with the host computer program without loading a functional component of the plug-in within program execution memory of a computer system executing the host computer program. The method further can include, responsive to a selection of the visual element, loading at least a portion of the functional component of the plug-in within program execution memory of the computer system.

Loading at least a portion of the functional component of the plug-in within program execution memory can include executing the at least a portion of the functional component of the plug-in.

Displaying, within a GUI of the host computer program, a visual element of a plug-in can include determining that the plug-in is registered with the host computer program, identifying a plug-in description file associated with the plug-in, and initially loading the plug-in description file without loading the functional component of the plug-in associated with the plug-in description file. Each visual element to be displayed for the plug-in can be determined from the plug-in description file.

The functional component of the plug-in can include a plurality of functions. Each of the plurality of functions can be associated with a visual element displayed within the GUI of the host computer program. In that case, loading the plug-in within program execution memory can include loading a particular function, selected from the plurality of functions, that is associated with the selected visual element.

Displaying, within a GUI of the host computer program, a visual element of a plug-in can include selectively enabling the visual element for display according to an operational state of the host computer program and/or selectively displaying the visual element according to an operational state of the host computer program. Displaying, within a GUI of the host computer program, a visual element of a plug-in also can include modifying an appearance of the visual element according to an operational state of the host computer program.

The computer-implemented method also can include dereferencing the plug-in within the host computer program and unloading the at least a portion of the functional component of the plug-in from program execution memory after dereferencing of the plug-in.

Another embodiment of the present invention can include a computer-implemented method of providing an integrated GUI including, responsive to executing a host computer program, locating a plug-in description file associated with a plug-in registered with the host computer program, determining at least one visual element of the plug-in to be displayed within a GUI of the host computer program from the plug-in description file, displaying the visual element within the GUI of the host computer program without executing a functional component of the plug-in, and responsive to a selection of the visual element, executing at least a portion of the functional component of the plug-in.

Displaying the visual element within the GUI of the host computer program without executing the functional component of the plug-in can include selectively displaying the visual element according to an operational state of the host computer program.

The computer-implemented method also can include modifying an appearance of the visual element according to an operational state of the host computer program.

Yet another embodiment of the present invention can include a computer program product including a computer-usable medium having computer-usable program code that, when executed by a computer system, causes the computer system to perform the various steps and/or functions disclosed herein.

BRIEF DESCRIPTION OF THE DRAWINGS

FIG. 2 is an example of a plug-in description file in accordance with another embodiment of the present invention.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to providing an integrated graphical user interface (GUI) for a computer program. In accordance with the embodiments disclosed within this specification, various aspects of a plug-in that is to execute cooperatively with a host computer program can be segmented or divided into different components. For example, visual elements of the plug-in may be specified independently of the functionality of the plug-in itself. By separating the visual elements from the functionality of the plug-in, the visual elements of the plug-in may be determined, loaded, and displayed within the GUI of the host computer program independently of executing the plug-in or loading the plug-in into memory of the computer system that executes the host computer program (host computer system). Separating the visual elements from the functionality of the plug-in allows the loading of the plug-in to be delayed until such time that the functionality of the plug-in is actually invoked or requested by a user, e.g., responsive to selecting a visual element that has been integrated into the GUI of the host computer program. Accordingly, more memory of the host computer system remains available for use by other processes and/or computer programs.

Figure 1:
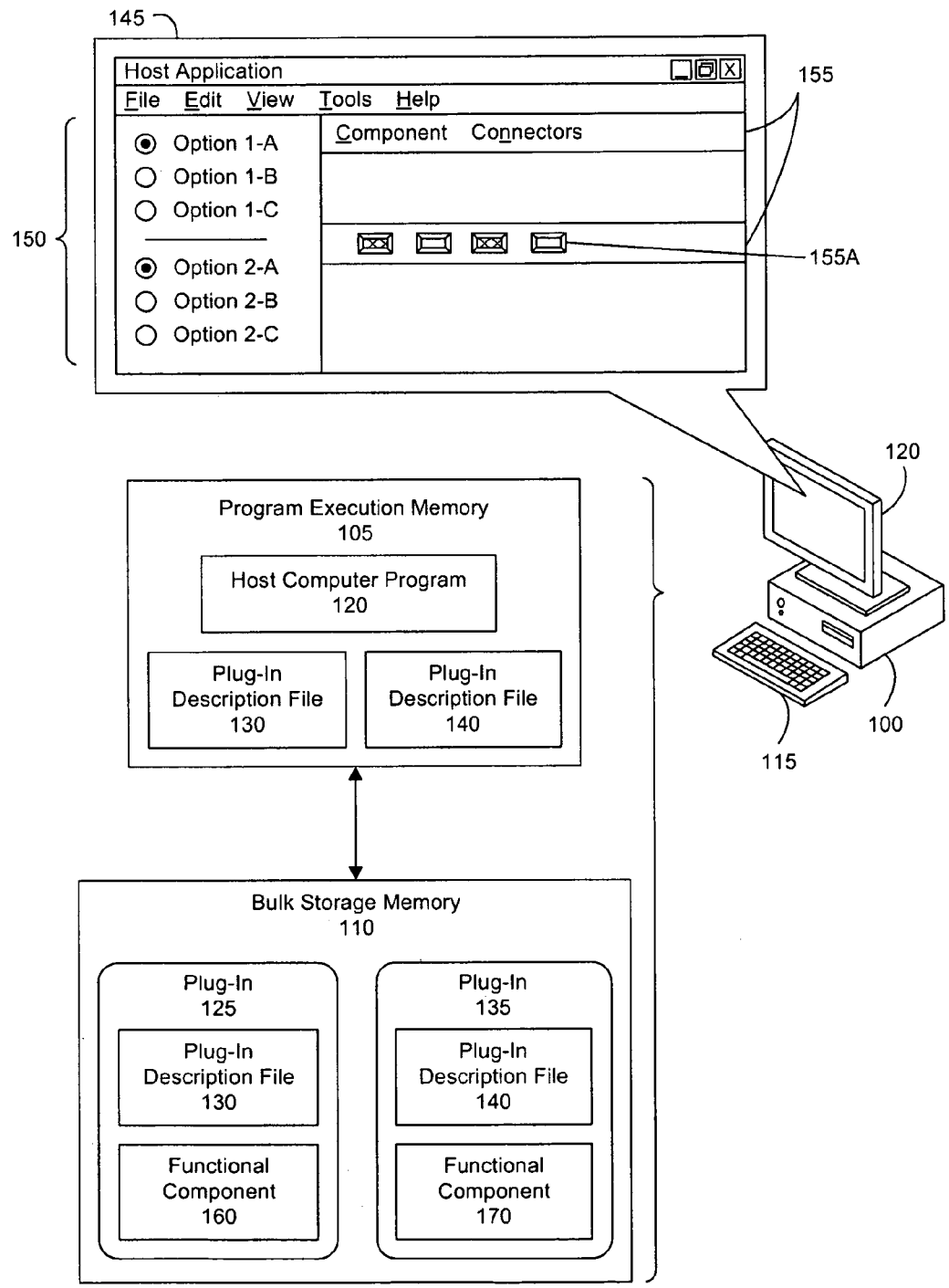
FIG. 1 is a block diagram illustrating a computer system that presents an integrated graphical user interface (GUI) in accordance with one embodiment of the present invention.

FIG. 1 is a block diagram illustrating a host computer system 100 that presents an integrated GUI 145 in accordance with one embodiment of the present invention. The host computer system 100, e.g., a data processing system suitable for storing and/or executing program code, will include at least one processor coupled directly or indirectly to memory elements through a system bus. The memory elements can include program execution memory 105 that is employed during actual execution of program code and a bulk storage memory 110.

Program execution memory 105 can refer to random access memory (RAM) or other forms of memory from which the processor of the host computer system 100 can directly execute program code. Typically, program execution memory 105 will be implemented as volatile memory, but this need not be the case. Program execution memory 105 may also be implemented as, or include, non-volatile memory in some computer systems. In other cases, program execution memory 105 may also refer to one or more cache memories which provide temporary storage of at least some computer program code. Cache memory can reduce the number of times program code must be retrieved from bulk storage memory 110 during execution of a computer program.

Bulk storage memory 110 can refer to a larger memory that typically is persistent, e.g., non-volatile, from which program code may be loaded into program execution memory 105 for execution by the processor of the host computer system 100. For example, bulk storage memory 110 can be some form of disc drive, whether magnetic, optical, or based upon some other technology.

Input/output (I/O) devices such as, for example, a keyboard 115, a display 120, a pointing device (not shown), etc., can be coupled to the host computer system 100 either directly or through intervening I/O controllers. Network adapters may also be coupled to the host computer system 100 to enable the host computer system 100 to become coupled to other host computer systems or remote printers or storage devices through intervening private or public networks. Modems, cable modems, and Ethernet cards are just a few of the currently available types of network adapters.

The host computer system 100 can execute a host computer program 120. The host computer program 120 can be a program that is capable of executing cooperatively with one or more plug-ins such as plug-in 125 and plug-in 135. As used herein, "executing cooperatively" can refer to the host computer program 120 providing an execution environment for a plug-in where the plug-in effectively runs within the host computer program 120. The phrase "executing cooperatively" further can refer to the situation in which the host computer program 120 executes concurrently with a plug-in. In that case, the host computer program 120 and the plug-in can communicate through an application programming interface (API) provided by the host computer program 120.

The host computer system 100 can execute the host computer program 120. Accordingly, the host computer program 120 is displayed within the program execution memory 105. As the host computer program 120 executes, each plug-in that is registered with the host computer program 120 can be identified. In this example, plug-in 125 and plug-in 135 each can be registered with the host computer program 120 and stored within the bulk storage memory 110.

In general, each of plug-ins 125 and 135 can be subdivided into several different components that allow the visual elements of each plug-in to be handled independently of the functional components of each plug-in. As shown, for example, plug-in 125 can include a plug-in description file 130 and a functional component 160. Similarly, plug-in 135 can include a plug-in description file 140 and a functional component 170.

Each of plug-in description files 130 and 140 can specify one or more visual elements that are to be displayed within a GUI of host computer program 120 as part of plug-ins 125 and 135 respectively. A visual element can refer to any sort of graphic interface element, whether a control panel, checkbox, button, toolbar, menu item, etc. In addition to specifying each visual element of plug-ins 125 and 135, each of plug-in description files 130 and 140 can specify the placement of each visual element of plug-ins 125 and 135 respectively within the GUI of host computer program 120 as well as any conditions, e.g., operational states of host computer program 120, in which one or more or all of the visual elements specified by description files 130 and 140 are to be presented or displayed. Other visual data such as tool tip text or status bar text to be displayed within the GUI of host computer program 120 in association with the visual elements of each of plug-ins 125 and 135 may also be specified within the plug-in description files 130 and 140.

In one embodiment, the functional component 160 of plug-in 125 and the functional component 170 of plug-in 135 each can be implemented as a compiled binary file, e.g., a dynamically linked library (DLL). Other implementations of the functional components 160 and 170 may be used depending upon the particular operating environment provided by the host computer program 120. For example, in some instances the functional components 160 and 170 may be specified in bytecode or other forms that do not require compilation.

It should be appreciated that originally the host computer program 120 may have been stored, and continue to be stored, within the bulk storage memory 110. The host computer program 120 is not illustrated as being stored within the bulk storage memory 110 to more clearly illustrate the embodiments disclosed within this specification, but may be.

When host computer program 120 executes and identifies plug-in 125 and plug-in 135 as being registered plug-ins, the plug-in description files 130 and 140 associated with each of respective plug-ins 125 and 135 can be identified or determined according to the registration data for each of plug-ins 125 and 135. When host computer program 120 executes, rather than load each plug-in that is registered with the host computer program 120 into program execution memory 105 in its entirety, or otherwise begin executing each plug-in, the plug-in description files 130 and 140 can be identified, loaded into program execution memory 105, and read. By initially loading the plug-in description files 130 and 140, e.g., responsive to the execution or launch of host computer program 120, the time required for initializing host computer program 120 is reduced. Each of plug-ins 125 and 135, and particularly functional components 160 and 170, need not be initialized. This translates into reduced time before a user may begin using host computer program 120 after launch since the plug-ins 125 and 135, or at least functional components 160 and 170 of plug-ins 125 and 135, need not be initially loaded or executed.

Thus, as shown, each of plug-in description files 130 and 140 is illustrated as having been loaded into program execution memory 105. Plug-ins 125 and 135 themselves, e.g., functional components 160 and 170 in reference to the program code that specifies or implements the functionality of each respective plug-in, is not initially loaded into program execution memory 105. Rather, each of functional components 160 and 170 can remain stored in bulk storage memory 110.

Host computer program 120 can read each of plug-in description files 130 and 140 and identify any visual elements that are specified within each of plug-in description files 130 and 140 that correspond to plug-ins 125 and 135 respectively. For example, each of plug-in description files 130 and 140 can specify locations at which the various visual elements, e.g., graphic images for buttons or the like, are stored so that host computer program 120 can retrieve the various visual elements and present those visual elements within a GUI without executing plug-ins 125 and 135. As described within this specification, the execution of a plug-in requires the loading of that plug-in, or at least the loading of the functional component, or a portion of the functional component, of that plug-in, into program execution memory 105 from bulk storage memory 110.

Thus, within GUI 145 of host computer program 120, visual elements 150, which correspond to plug-in 125 can be displayed. Visual elements 150, in this case a series of radio buttons for options 1-A, 1-B, 1-C, 2-A, 2-B, and 2-C, is specified by plug-in description file 130. Visual elements 155, which correspond to plug-in 135, can be displayed. Visual elements 155, in this case the menu bar including the menu items "Component" and "Connectors" and the toolbar including selectable button visual elements, can be specified by plug-in description file 140.

FIG. 1 illustrates one embodiment in which visual elements of plug-ins may be incorporated into the GUI of a host computer program without first loading or executing the plug-ins. As noted, host computer program 120 can begin executing and display the visual elements 150 and 155 without loading plug-ins 125 or 135 by accessing the plug-in description files 130 and 140.

Responsive to a user input selecting a visual element, e.g., a visual element from either the group of visual elements 150 or the group of visual elements 155, the plug-in, or portion thereof, associated with the selected visual element can be loaded into program execution memory 105. For example, responsive to a user input selecting visual element 155A, functional component 160 of plug-in 135, or a function (portion) of functional component 160, can be executed. In that case, functional component 160, or a portion thereof, of plug-in 135 that is associated with visual element 155A can be loaded in program execution memory 105 and executed. The plug-in description file 140 can specify a mapping or association of visual elements with the functional component 160 or portions thereof, e.g., functions, or entry points, of the associated plug-in.

The embodiments presented with reference to FIG. 1 allow users to access controls and preferences of plug-ins from within host computer program 120 without first having to execute the plug-in or load the plug-in into memory. The separation of visual components from functional components of the plug-ins can save a significant amount of memory resources within host computer system 100 that may be used for other computing purposes beyond execution of host computer program 120. Further, as noted, this can reduce the amount of time needed for the host computer program 120 to begin executing and be initialized for use by a user.

While the plug-in description files are depicted as being part of each plug-in, this need not be the case. In another embodiment, for example, each plug-in description file, while being associated with a plug-in, can exist as an independent file, e.g., as a contract that exists between the host computer program 120 and the plug-in, but which is not actually part of the plug-in. Further, the various visual elements described with reference to FIG. 1 can be stored within bulk storage memory 110 or within another data storage device, whether local to, or remotely located from, host computer system 100.

In another embodiment, the host computer program 120 can be configured, on a per-plug-in basis, for example, to selectively load each plug-in upon startup. This allows some plug-ins to be loaded in the conventional manner so that the plug-in is immediately available for use, while one or more other plug-ins can be handled in the manner described where the functional components are not loaded until a selection of a graphic element associated with that functional component is made by the user.

Allowing independent handling of plug-ins as described also facilitates a save/restore function in which users can be provided an option that restarts the host computer program 120 in the same state that existed upon exit of the host computer program 120 in a prior session. In illustration, if the functional component 160 of plug-in 125 was used in a prior session of the host computer program 120, but plug-in 135 was not used, the next time that host computer program 120 is started, the functional component 160 of plug-in 125 can be automatically loaded, e.g., plug-in 125 can be automatically loaded as in a conventional system. Plug-in 135, however, and particularly the functional component 170 of plug-in 135, will not be loaded until such time that the user selects a visual element associated with functional component 170.

FIG. 2 is an example of a plug-in description file 200 in accordance with another embodiment of the present invention. In the example illustrated in FIG. 2, the plug-in description file 200 is formatted using Extensible Markup Language (XML). It should be appreciated that any of a variety of different formats or file types may be used to specify the information illustrated in plug-in description file 200. As such, while an XML file is used as the plug-in description file in FIG. 2, the embodiments disclosed within this specification are not intended to be limited solely to the use of XML.

Upon executing the host computer program, the host computer program can determine that the plug-in "guiLightPlugin" is a registered plug-in. Accordingly, the host computer program can identify and load the plug-in description file 200 associated with the registered plug-in. The host computer program can determine or identify the various visual elements that are to be displayed within the GUI of the host computer program. The visual elements may be, for example, entire menus, entire toolbars, or individual controls such as buttons for existing toolbars of the host computer program or menu items for existing menus of the host computer program.

The plug-in description file 200 references a plug-in called "guiLightPlugin," which is the plug-in associated with plug-in description file 200. In this example, the plug-in has been separated into two different DLLs. This need not be the case, however, as the plug-in may be implemented as a single DLL, two DLLs, or as more than two DLLs. In any case, one DLL is referenced as "libGui_GfqTestPlugin1," e.g., within segment 205 of the plug-in description file 200. The other DLL is referenced as "libGui_LightPluginPref," e.g., within segment 235.

Segment 210 defines the command "te-launch-plugin" for "libGui_GfqTestPlugin1" and specifies a visual element in the form of a menu item that can be displayed within the GUI of the host computer program. In this case, that menu item is "Launch Plugin," the selection of which will execute the command "te-launch-plugin." Segment 210 further specifies the tool tip text "Launch Plugin" that may be displayed when a pointer hovers over the displayed menu item. Segment 210 further specifies whether an icon is associated with the menu item "Launch Plugin." In this case, the value "false" indicates that no icon is to be presented with the menu item. If, however, an icon is specified, a path to the icon file can be specified. In that case, the host computer program can locate the icon file and display the icon as a visual element proximate to, or next to, the text "Launch Plugin" of the menu item when the appropriate menu is accessed within the GUI of the host computer program.

Segment 215 specifies that the command "te-launch-plugin" is to be accessible or listed beneath the "Edit" menu within the menu bar of the host computer program. Thus, as "te-launch-plugin" has been defined in segment 210, the visual element "Launch Plugin" will be displayed as a menu item beneath the "Edit" menu within the menu bar of the host computer program. Selection of the "Launch Plugin" menu item beneath the "Edit" menu will load the "libGui_GfqTestPlugin1" DLL and call the entry point function for that DLL.

Segment 220 defines a toolbar button type of visual element that can be added to a toolbar that is displayed within the host computer program. The toolbar button also can be associated with the command "te-launch-plugin." Accordingly, activation of the toolbar button will execute the "te-launch-plugin" command, which loads the "libGui_GfqTestPlugin1" DLL and call the entry point function for that DLL.

Segment 225 adds a filter to the "Open" function accessible from the "File" menu within the host computer program. In this example, responsive to a user selection of "File" menu from the menu bar and the "Open" menu item beneath the "File" menu, a filter allowing only text files, or files with a "txt" file extension will be displayed. That is, the file type portion of the file open dialog that is typically presented to a user within the host computer program can be set, or pre-filled with the allowable file extensions, so that only allowable file types, in this case text files, are shown.

Segment 230 specifies that when a new file is being created, e.g., when a user selects the menu item "New" from the "File" menu in the menu bar, the default file name will be "Test Plugin" as a new document is created.

Segment 235 specifies the DLL "libGui_LightPluginPref" through which a user may specify one or more settings, e.g., preferences, that dictate the manner in which the "libGui_GfqTestPlugin1" DLL functions. Segment 240 includes the closing tag for the "guiLightPlugin" plug-in description file 200.

By loading the plug-in description file 200 and determining the various visual elements to be incorporated into the GUI of the host computer program, the visual elements can be displayed or displayed when appropriate, e.g., according to state of the host computer program. For example, a menu item such as "Launch Plugin" that is beneath the "Edit" menu in the menu bar of the host computer program would only be viewable when the host computer program is placed in a state corresponding to the user providing an input that selects the "Edit" menu. Accordingly, the operating state of the host computer program would be such that the "Edit" menu has been selected in order to display the "Launch Plugin" menu item.

The visual elements described with reference to FIG. 2 can be displayed within the host computer program without loading or executing the plug-in itself, e.g., the binary file or DLL. The plug-in may be loaded into memory, e.g., program execution memory, responsive to a user selecting a visual element of the plug-in. At that point, an entry function of the plug-in may be called.

Figure 3:
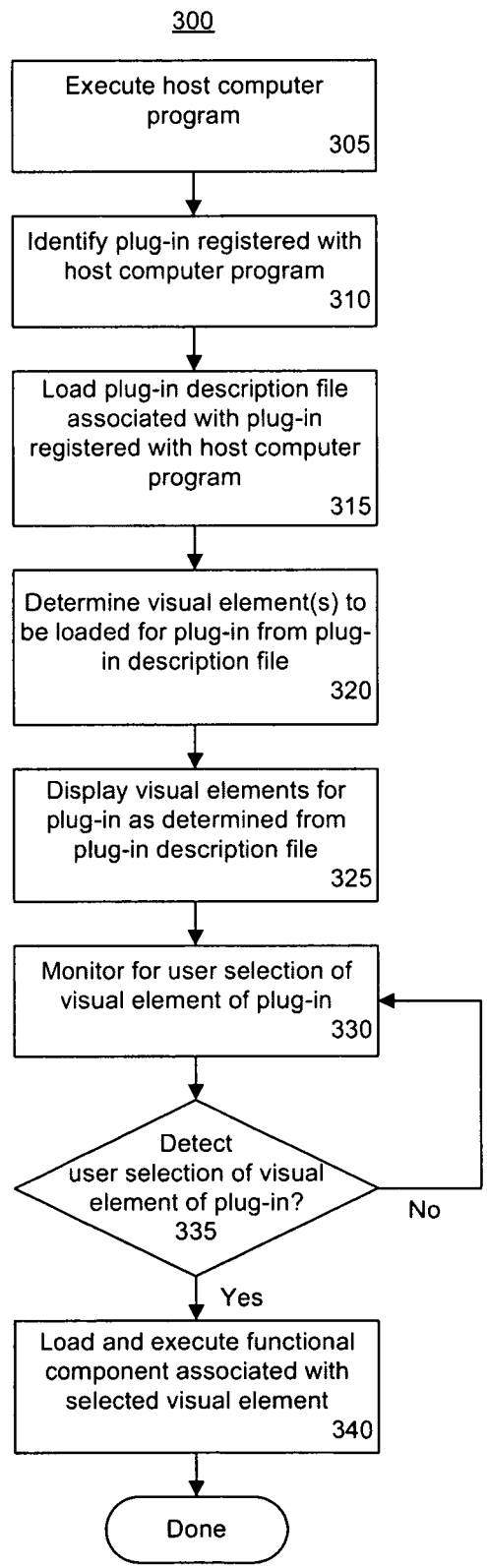
FIG. 3 is a first flow chart illustrating a method of presenting an integrated GUI in accordance with another embodiment of the present invention.

FIG. 3 is a first flow chart illustrating a method 300 of presenting an integrated GUI in accordance with another embodiment of the present invention. Method 300 can be implemented using a system as described with reference to FIGS. 1 and 2. As used herein, the term "system" can refer to the host computer system executing the host computer program. Accordingly, beginning in step 305, the host computer program can be executed within the host computer system. The host computer program may be executed automatically responsive to a selected programmatic event or executed responsive to a user request.

In step 310, the system can identify the plug-in that is registered with the host computer program. As noted, each plug-in that may be executed by the host computer program can be registered, e.g., identified on a list of plug-ins that are executable by the host computer-program. The list may be maintained by the system. The registration may specify one or more file types, e.g., file extensions, that may be launched or handled by each plug-in registered with the system.

In one embodiment, the host computer program can include a plug-in manager. The plug-in manager can identify those plug-ins registered with the host computer program. Further, the plug-in manager can handle queries from different functions of the host computer program that are tasked with menu construction, toolbar construction, or the like, e.g., those functions that display the visual elements within the host computer program. The plug-in manager can determine the visual elements to be displayed from the plug-in description files and optionally other parameters such as the operational state of the host computer program responsive to queries from the functions as disclosed within this specification and respond to each querying function as may be required with any visual elements, or references thereto, to be displayed.

In step 315, the system can identify the plug-in description file associated with the plug-in identified in step 310 and load the plug-in description file into program execution memory. The plug-in description file for each respective plug-in may be specified within the list maintained by the system that specifies registered plug-ins. In step 320, the system can determine, from the plug-in description file, the visual element(s) that are to be displayed within the GUI of the host computer program. As noted, the plug-in description file can specify the different visual elements to be displayed within the GUI of the host computer program, the circumstances under which each visual element is to be displayed, e.g., the operating state of the host computer program when each visual element is displayed, the location within the GUI of the host computer program in which each visual element is to be displayed, as well as one or more programmatic actions to be performed responsive to a selection of each visual element, e.g., execution of the functional component of the plug-in or a particular function of the functional component of the plug-in.

In step 325, the system can display the visual elements for the plug-in that are determined from the plug-in description file within the GUI of the host computer program. The visual elements can be located from a data storage unit as determined from the plug-in description file without loading the plug-in into program execution memory. In step 330, the system can monitor for a user input selecting of one or more of the visual elements of the plug-in displayed within the GUI of the host computer program.

In step 335, the system can determine whether a user input selecting a visual element of the plug-in has been detected. When a user input selecting a visual element of the plug-in is detected, the method can continue to step 340. When no user input selecting a visual element of the plug-in is detected, the method can loop back to step 330 and continue monitoring for a user input selecting a visual element of the plug-in.

In step 340, responsive to the user input selecting a visual element of the plug-in, the system can load and execute the functional component of the plug-in associated with the visual element as specified by the plug-in description file. As noted, the system can load and execute the entire functional component or any portion thereof that has been associated with the selected visual element within the plug-in description file.

The method 300 of FIG. 3 has been described with reference to a single plug-in being registered with the host computer program for the purpose of illustration. The embodiments disclosed within this specification are not intended to be limited to such an example. Accordingly, it should be appreciated that method 300 can be implemented with a plurality of plug-ins being registered with the host computer program.

The method 300 of FIG. 3 illustrates how the presentation of visual elements of a plug-in may be separated from the loading and execution of the functional component of the plug-in into program execution memory of the host computer system. This separation allows program execution memory that would otherwise be used to execute the functional component of the plug-in, despite no functionality of the plug-in being used or accessed, to be available for other purposes, e.g., other computer programs or functions as the case may be.

It should be appreciated that steps 305-330 can be performed automatically by the system responsive to execution of the host computer program. Loading and/or execution of the plug-in is performed responsive to a user input selecting a displayed visual element of the plug-in.

Figure 4:
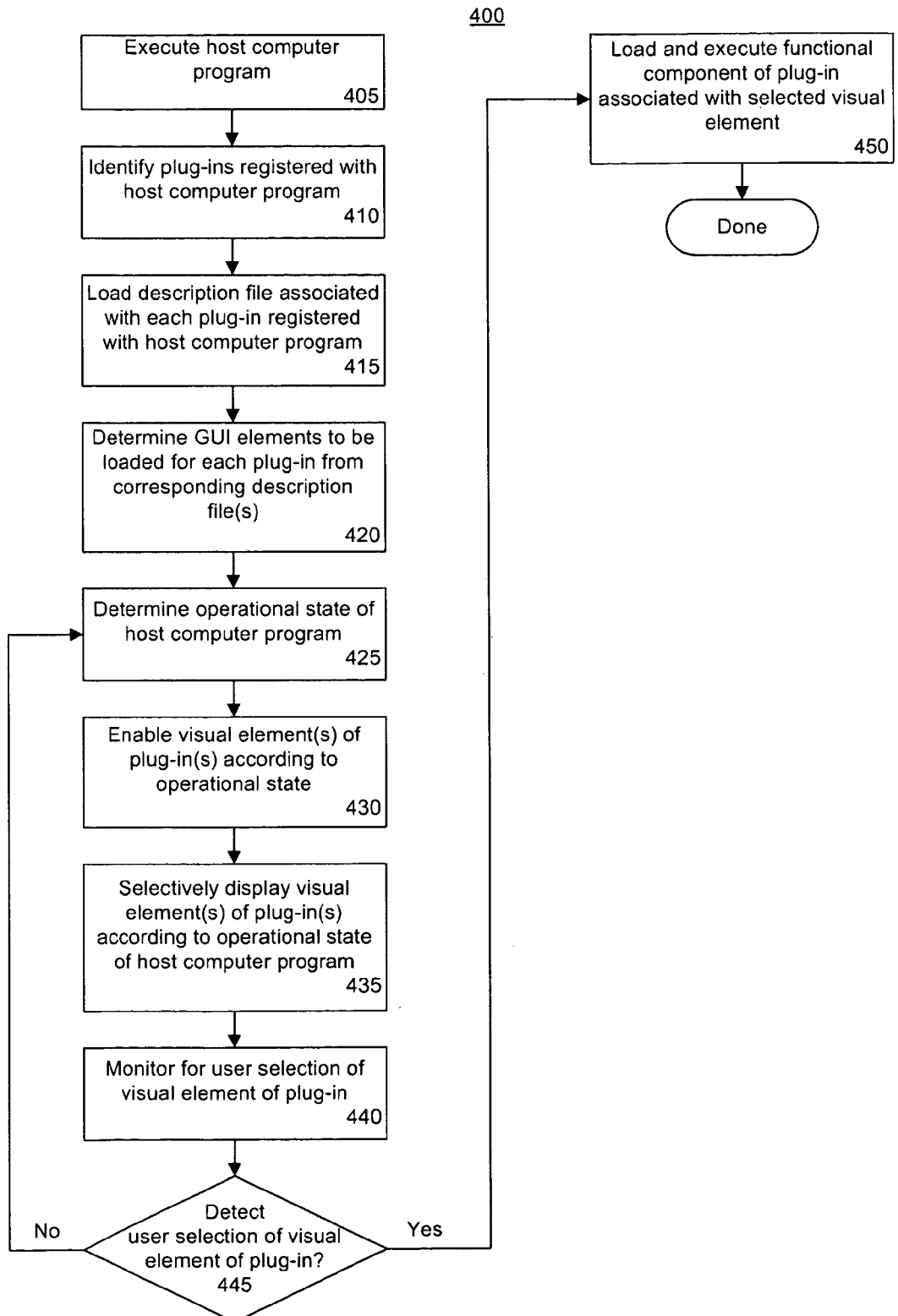
FIG. 4 is a second flow chart illustrating a method of presenting an integrated GUI in accordance with another embodiment of the present invention.

FIG. 4 is a second flow chart illustrating a method 400 of presenting an integrated GUI in accordance with another embodiment of the present invention. Method 400 can be implemented using a system as illustrated with reference to FIGS. 1 and 2. Accordingly, beginning in step 405, the host computer program can be executed. In step 410, the system can identify each plug-in that is registered with the host computer program. In step 415, the system can load the plug-in description file associated with each registered plug-in of the host computer program.

In step 420, the system can determine the GUI elements for each registered plug-in from the plug-in description file associated with each respective registered plug-in. In step 425, the system can determine the operational state of the host computer program. Accordingly, in step 430, the system can enable selected visual element(s) specified by the plug-in description files according to the operational state of the host computer program determined in step 425. As noted, the plug-in description file for each plug-in can specify the particular operational state in which visual elements for the plug-in associated with the plug-in description file are to be displayed. As used herein, the term "enable" can refer to designating a visual element as one that is to be displayed in response to determining that the host computer program is in a particular operating state. Conversely, a visual element that is not enabled is one that may not be displayed as the host computer program is not in the correct operating state in which that visual element is to be displayed.

In step 435, the system can selectively display any of the visual elements of the registered plug-ins as determined according to the operational state of the host computer program and the plug-in description files for the registered plug-ins. That is, the system can display those visual elements that have been enabled. For example, when a plug-in description file for a plug-in specifies a menu item type of visual element to be added to the "File" menu of the host computer program, the visual element will only be enabled, and therefore displayed, when the operational state of the host computer program indicates that a user input selecting the "File" menu has been received thereby causing the display of the menu items beneath the "File" menu within the GUI of the host computer program.

In some cases, a visual element of a plug-in that is not enabled may still be displayed, albeit in a manner that indicates that the functionality of the visual element is not available to the user in the current operational state. In that case, for example, a user may select the "File" menu. While an menu item for a plug-in may be displayed beneath the "File" menu, the operational state of the host computer program may be such that the menu item corresponding to the plug-in is not available. In that case, the visual element, e.g., the menu item, may be displayed beneath the "File" menu, but in a dimmed state, or with an altered appearance, indicating that the user may not select the menu item.

As noted, though the plug-in description files associated with the registered plug-ins are loaded into program execution memory of the system and read by the system, the functional component of the plug-ins associated with the plug-in description files are not loaded into program execution memory and are not executed until a user input selecting a visual element of the plug-ins is detected. Accordingly, the visual elements of each registered plug-in can be displayed within the GUI of the host computer program without concurrent execution of the functional component of the registered plug-in.

In step 440, the system can monitor for a user input selecting a visual element of a registered plug-in of the host computer program. The system can perform steps 405-440 automatically and in response to execution of the host computer program.

In step 445, the system can determine whether a user input selecting a visual element of a registered plug-in has been received. When such a user input is received, the method can proceed to step 450. When no user input is received that selects a visual element of a registered plug-in of the host computer program, the method can loop back to step 425 and continue executing as described. In step 450, the system can load and execute the functional portion of the plug-in, or portion thereof, that is associated with the selected visual element, as specified within the plug-in description file.

In another embodiment, the host computer program can be programmed to dereference each plug-in responsive to an event indicating that the plug-in has completed a processing task or is otherwise no longer needed by the host computer program. By dereferencing the plug-in when execution of the plug-in is complete, the plug-in, and particularly any functional component of the plug-in, can be unloaded from program execution memory, thereby freeing the program execution memory for use by other computer programs and/or plug-ins as the case may be.

In still another embodiment, plug-ins can be hierarchical in that one plug-in description file can reference one or more other plug-in description files. This allows a first plug-in, for example, to load the description file and access visual elements of a second plug-in without having to load the functional component of the second plug-in.

In addition, while each plug-in has been illustrated with its own plug-in description file, in another embodiment, a plurality of plug-ins, or functional components, can be associated with a single plug-in description file. Such a structure allows, for example, a plurality of plug-ins or functional components to share one or more visual elements, but implement different functionality. In illustration, a single plug-in description file can be associated with a first plug-in that provides particular functionality and a second plug-in that provides the same or similar functionality, albeit at a higher or more detailed level. For example, the first plug-in may provide basic functionality in a lightweight implementation whereas the second plug-in provides more detailed and in depth functionality in a heavier, e.g., more resource intensive, implementation. Through various preferences established in the host computer program, the particular plug-in that is used or loaded can be specified though at least some, if not all, of the visual elements for each of the first and second plug-ins are shared as each can be referenced by the same plug-in description file.

The use of plug-in description files allows separation of visual elements of the plug-ins from the functionality of the plug-ins. In addition to the various benefits described within this specification, the use of plug-in description files lends each plug-in to modern searching and indexing functions. This allows users to search for particular functionality in plug-ins, as specified by the plug-in description files, and, optionally, load only those plug-ins that may be desired upon launch of the host computer program. This also allows new plug-ins to be added to a computer program, but still provide the user with the ability to selectively load only those that are desired. For example, responsive to a query, only those plug-ins having a plug-in description file that matches or corresponds to the query can be loaded or executed responsive to program launch by the plug-in manager. In addition, implementation of plug-ins in accordance with the embodiments described within this specification facilitates the updating of plug-ins without having to update the entire host computer program.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of providing an integrated graphical user interface, the method comprising:
    responsive to executing a host computer program, displaying, within a graphical user interface of the host computer program, a plurality of visual elements of a plug-in that executes in cooperation with the host computer program;
    wherein the plug-in is divided into the plurality of visual elements that are activated by user input and a functional component loaded into memory of a local computer system at different times;
    wherein the functional component of the plug-in comprises a plurality of functions and each of the plurality of functions is associated with at least one different visual element of the plurality of visual elements displayed within the graphical user interface of the host computer program;
    wherein the plurality of visual elements are displayed without loading the functional component of the plug-in within program execution memory of the local computer system executing the host computer program; and
    responsive to a selection of a selected one of the plurality of visual elements, loading a portion of the functional component of the plug-in comprising a particular function of the plurality of functions associated with the selected visual element within program execution memory of the local computer system and executing the portion of the functional component of the plug-in within the local computer system.

2. The method of claim 1, wherein displaying, within a graphical user interface of the host computer program, a visual element of a plug-in comprises:
    determining that the plug-in is registered with the host computer program;
    identifying a plug-in description file associated with the plug-in; and
    initially loading the plug-in description file without loading the functional component of the plug-in.

3. The method of claim 2, further comprising determining each visual element to be displayed for the plug-in from the plug-in description file.

4. The method of claim 1, wherein each of the plurality of functions is implemented as an independent compiled binary file that is part of the plug-in, and wherein only the compiled binary file associated with a selected visual element is loaded into program execution memory and executed.

5. The method of claim 1, wherein the host computer program includes a plurality of plug-ins; and wherein the host computer program is configured on a per plug-in basis to either load the plug-in inclusive of a functional component of the plug-in responsive to execution of the host computer program or to load a functional component of the plug-in only responsive to a user input selecting a visual element associated with the functional component from within the host computer program.

6. The method of claim 5, further comprising:
    configuring the host computer program to restart with same functional components of the plurality of plug-ins loaded into program execution memory of the local computer system that were loaded upon a prior exit of the host computer program; and
    wherein the functional components of the plurality of plug-ins not loaded into program execution memory upon the prior exit are not loaded into program execution memory upon restart of the host computer program.

7. A method of providing an integrated graphical user interface, the method comprising:
    responsive to executing a host computer program,
        locating a plug-in description file associated with a plug-in registered with the host computer program;
        determining a plurality of visual elements of the plug-in to be displayed within a graphical user interface of the host computer program from the plug-in description file using a processor;
        displaying the plurality of visual elements within the graphical user interface of the host computer program without loading a functional component of the plug-in within a program execution memory; and
        wherein the functional component of the plug-in comprises a plurality of functions and each of the plurality of functions is associated with at least one different visual element of the plurality of visual elements displayed within the graphical user interface of the host computer program;
    responsive to a selection of a selected one of the plurality of visual elements, loading a portion of the functional component comprising a particular function of the plurality of functions associated with the selected visual element into the program execution memory and executing the particular function of the plug-in;
    wherein the functional component executes in a same computer system that executes the host computer program.

8. The method of claim 7, wherein the host computer program includes a plurality of plug-ins; and
wherein the host computer program is configured on a per plug-in basis to either load the plug-in inclusive of a functional component of the plug-in responsive to execution of the host computer program or to load a functional component of the plug-in only responsive to a user input selecting a visual element associated with the functional component from within the host computer program.

9. The method of claim 7, wherein the plug-in description file is hierarchical and comprises a reference to a different plug-in description file for a different plug-in, the method further comprising:
accessing at least one visual element of the different plug-in through the reference to the different plug-in description file within the plug-in description file without loading a functional component of the different plug-in.

10. A computer program product comprising:
a non-transitory computer-usable medium comprising computer-usable program code that provides an integrated graphical user interface, the computer-usable medium comprising:
computer-usable program code that, responsive to executing a host computer program, displays, within a graphical user interface of the host computer program, a plurality of visual elements of a plug-in that executes in cooperation with the host computer program;
wherein the plug-in is divided into the plurality of visual elements that are activated by user input and a functional component loaded into memory of a local computer system at different times;
wherein the functional component of the plug-in comprises a plurality of functions and each of the plurality of functions is associated with at least one different visual element of the plurality of visual elements displayed within the graphical user interface of the host computer program;
wherein the plurality of visual elements are displayed without loading the functional component of the plug-in within program execution memory of the local computer system that executes the host computer program; and
computer-usable program code that, responsive to a selection of a selected one of the plurality of visual elements, loads a portion of the functional component of the plug-in comprising a particular function selected from the plurality of functions associated with the selected visual element within program execution memory of the local computer system, and executes the portion of the functional component of the plug-in within the local computer system.

11. The computer program product of claim 10, wherein the computer-usable program code that displays, within a graphical user interface of the computer program, a visual element of a plug-in comprises:
computer-usable program code that determines that the plug-in is registered with the host computer program;
computer-usable program code that identifies a plug-in description file associated with the plug-in; and
computer-usable program code that initially loads the plug-in description file without loading the functional component of the plug-in associated with the plug-in description file.

12. The computer program product of claim 11, wherein the computer-usable medium further comprises computer-usable program code that determines each visual element to be displayed for the plug-in from the plug-in description file.

13. The computer program product of claim 10, wherein each of the plurality of functions is implemented as an independent compiled binary file that is part of the plug-in, and wherein only the compiled binary file associated with a selected visual element is loaded into program execution memory and executed.

14. The computer program product of claim 10, wherein the host computer program includes a plurality of plug-ins; and
wherein the host computer program is configured on a per plug-in basis to either load the plug-in inclusive of a functional component of the plug-in responsive to execution of the host computer program or to load a functional component of the plug-in only responsive to a user input selecting a visual element associated with the functional component from within the host computer program.

15. The computer program product of claim 10, further comprising:
configuring the host computer program to restart with same functional components of the plurality of plug-ins loaded into program execution memory of the local computer system that were loaded upon a prior exit of the host computer program; and
wherein the functional components of the plurality of plug-ins not loaded into program execution memory upon the prior exit are not loaded into program execution memory upon restart of the host computer program.

* * * * *